United States Patent
Mandal et al.

(10) Patent No.: US 6,728,640 B2
(45) Date of Patent: Apr. 27, 2004

(54) METHOD OF SHORT TERM FORECASTING OF MODERATE SIZE EARTHQUAKES

(75) Inventors: Prantik Mandal, Hyderabad (IN); Bal Krishna Rastogi, Hyderabad (IN); Rajender Kumar Chadha, Hyderabad (IN); Hari Venkata Subrahmanya Satyanarayana, Hyderabad (IN); C. Surya Prakash Sarma, Hyderabad (IN); Narendra Kumar, Hyderabad (IN); Chintamani Satyamurthy, Hyderabad (IN); I. Prasada Raju, Hyderabad (IN); A. Nageswara Rao, Hyderabad (IN)

(73) Assignee: Council of Scientific & Industrial Research (IN)

( * ) Notice: Subject to any disclaimer, the term of this patent is extended or adjusted under 35 U.S.C. 154(b) by 0 days.

(21) Appl. No.: 10/102,874

(22) Filed: Mar. 22, 2002

(65) Prior Publication Data

US 2003/0182065 A1 Sep. 25, 2003

(51) Int. Cl.[7] ................................. G01V 1/28
(52) U.S. Cl. ....................................... 702/15
(58) Field of Search ........................... 702/15; 324/348; 340/690

(56) References Cited

U.S. PATENT DOCUMENTS

| | | | | | |
|---|---|---|---|---|---|
| 4,825,165 | A | * | 4/1989 | Helms et al. | 324/323 |
| 5,270,649 | A | * | 12/1993 | Laukien | 324/300 |
| 6,246,964 | B1 | * | 6/2001 | Blaunstein | 702/15 |
| 6,373,396 | B2 | * | 4/2002 | Zamfes | 340/690 |
| 6,389,361 | B1 | * | 5/2002 | Geiser | 702/15 |
| 2002/0103603 | A1 | * | 8/2002 | Kawashima | 702/15 |

* cited by examiner

*Primary Examiner*—Marc S. Hoff
*Assistant Examiner*—Anthony Gutierrez
(74) *Attorney, Agent, or Firm*—Piper Rudnick LLP; Steven B. Kelber

(57) ABSTRACT

Foreshocks are key to understand the dynamics of earthquake processes, thus, they can lead to short-term earthquake prediction. The method consists the steps of detecting/observing a foreshock clustering/nucleation zone, which grew over a 100 hours period prior to the main-shock occurrence, and studying the deepening of nucleation zone to foresee a hypocenter of a future moderate size reservoir-triggered earthquake at the base of the seismogenic layer

24 Claims, 8 Drawing Sheets

---

Obtain seismograms of shallow local earthquakes of focal depths less than or equal to the depth of base of the seismogenic layer.

⇓

Obtain refracted crustal phases Pg and Sg from the bottom of a granite layer and apply an earthquake location program on the refracted crustal phases to estimate hypocentral parameters selected from latitude, original time, focal depth and magnitude.

⇓

Select foreshock seismograms for the events that occur within 5-8 km of the mainshock location and about 100 hours prior to the occurrence of main shock.

⇓

Plot epicenters of foreshocks from the data obtained in the two immediately preceding steps to detect the spatial clustering.

⇓

Plot focal depths of foreshocks within the time-frame up to 100 hours prior to the main shock occurrence to observe a foreshock cluster defined as the nucleation zone of pre-seismic slip at shallow depth varying from 0 to 3 km depth.

⇓

Study the deepening of the nucleation zone over time and pinpoint the hypocenter and time of the main shock at the base of the seismogenic layer as a prediction for the plotted focal depth data.

Figure 1. A plot showing three component of seismograms (vertical, north-south and east-west) recorded on 16 bit digital seismographs. Pg and Sg phases are marked with a view to demonstrate the routine analysis of 3-component seismograms for a local earthquake. Generally, Pg is read from vertical and Sg is read from horizontal seismograms either NS or EW depending on clear phases. Similar analysis is carried out for other five or more stations. Then,these phase data comprising of Pg and Sg phases from atleast six stations along with a crustal velocity model are used as inputs to the location program for estimating the hypocentral parameters for a local earthquake.

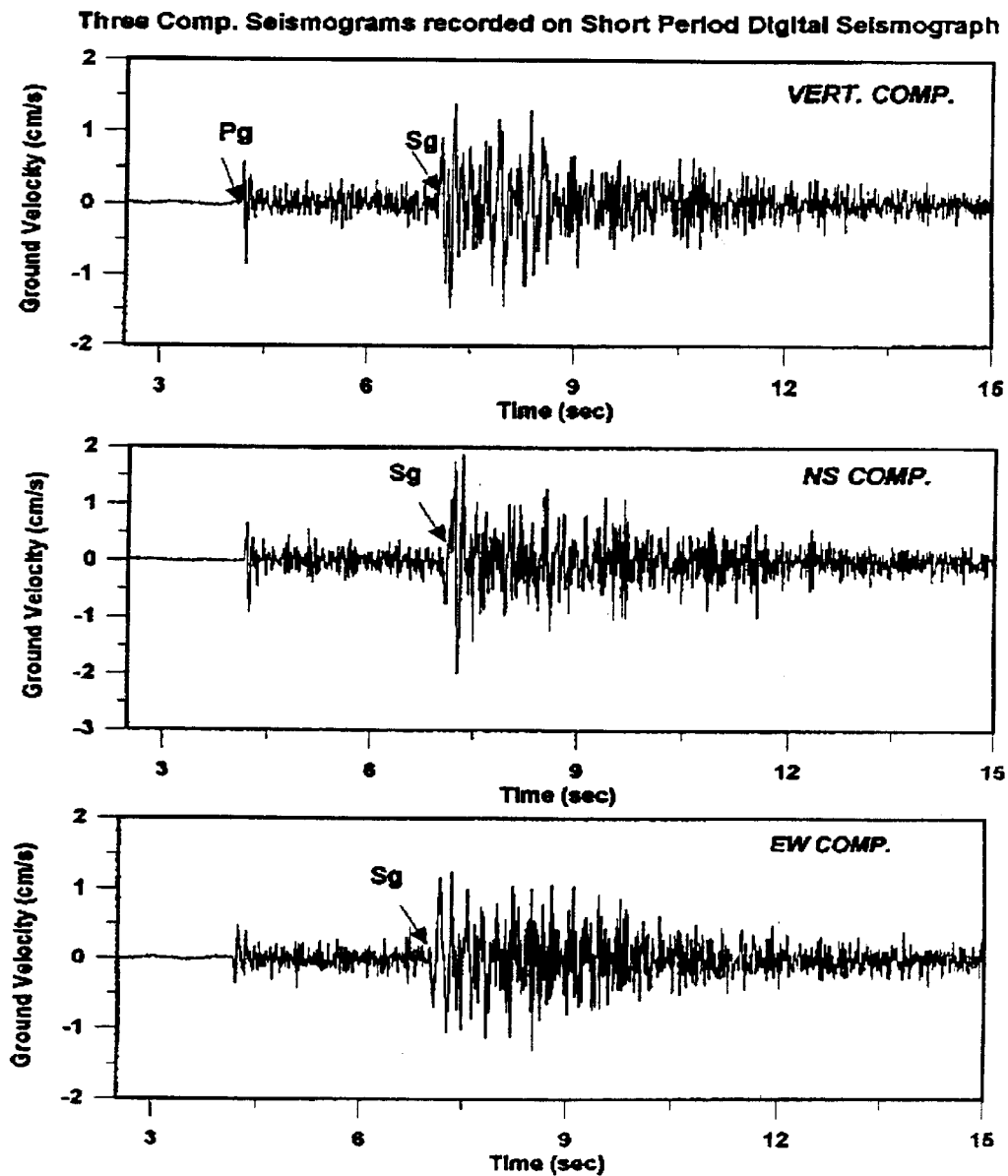

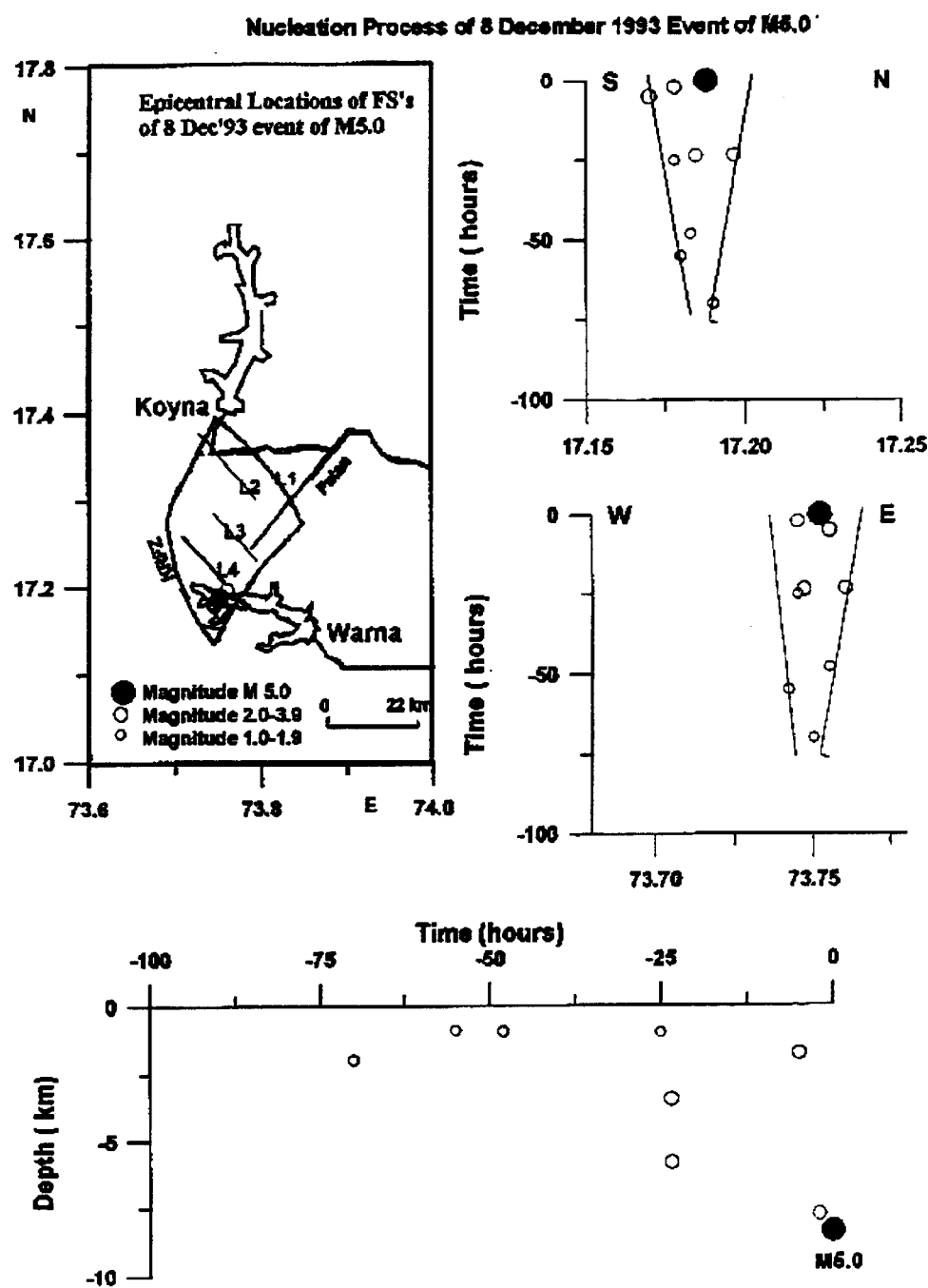
Figure 2. Nucleation process study for 8 December 1993 event (a) Epicentral location map for the foreshocks and (b) depth Vs time plot for the foreshocks.

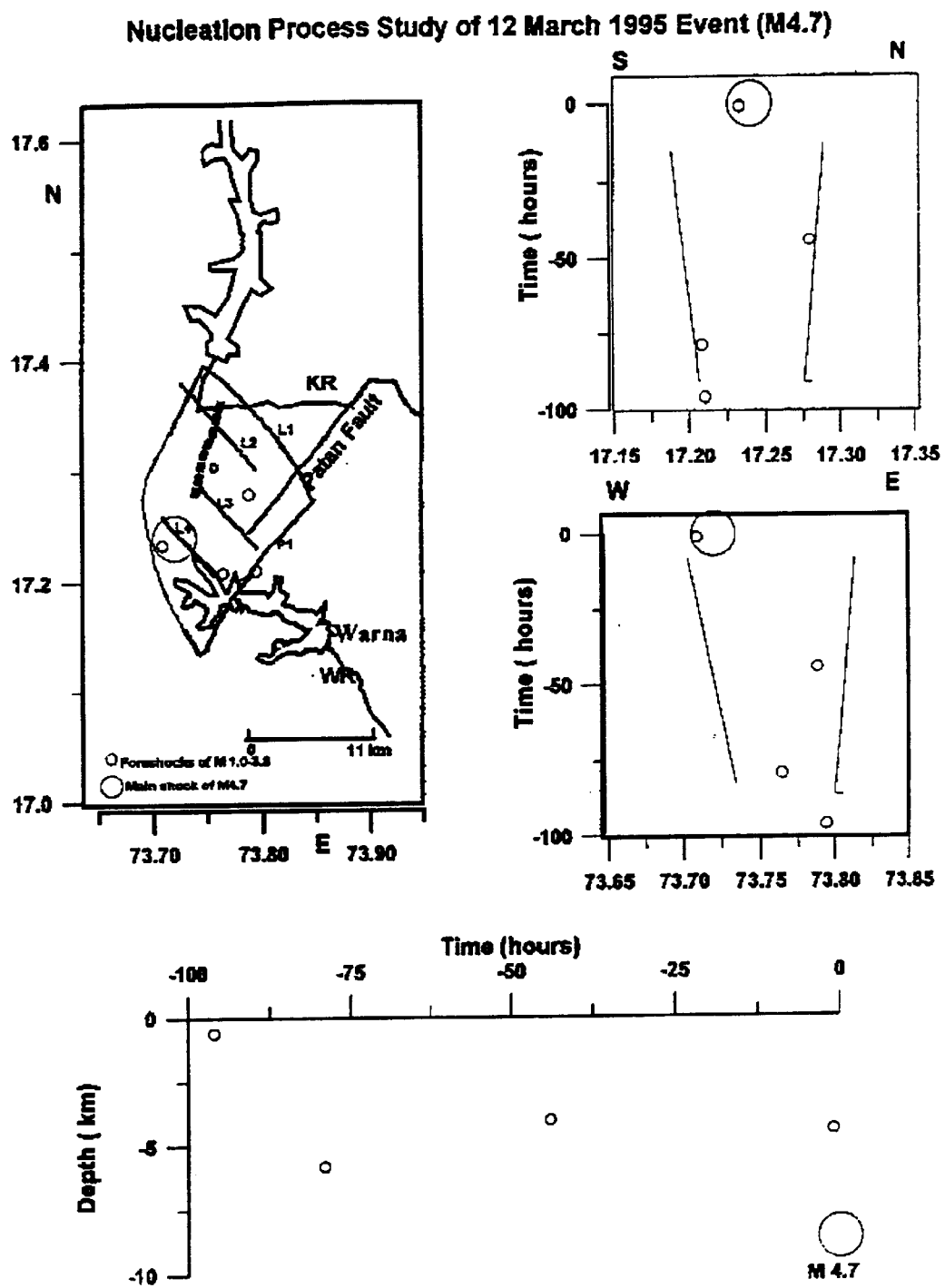
Figure 3. Nucleation process study for 12 March 1995 event (a) Epicentral location map for the foreshocks and (b) depth Vs time plot for the foreshocks.

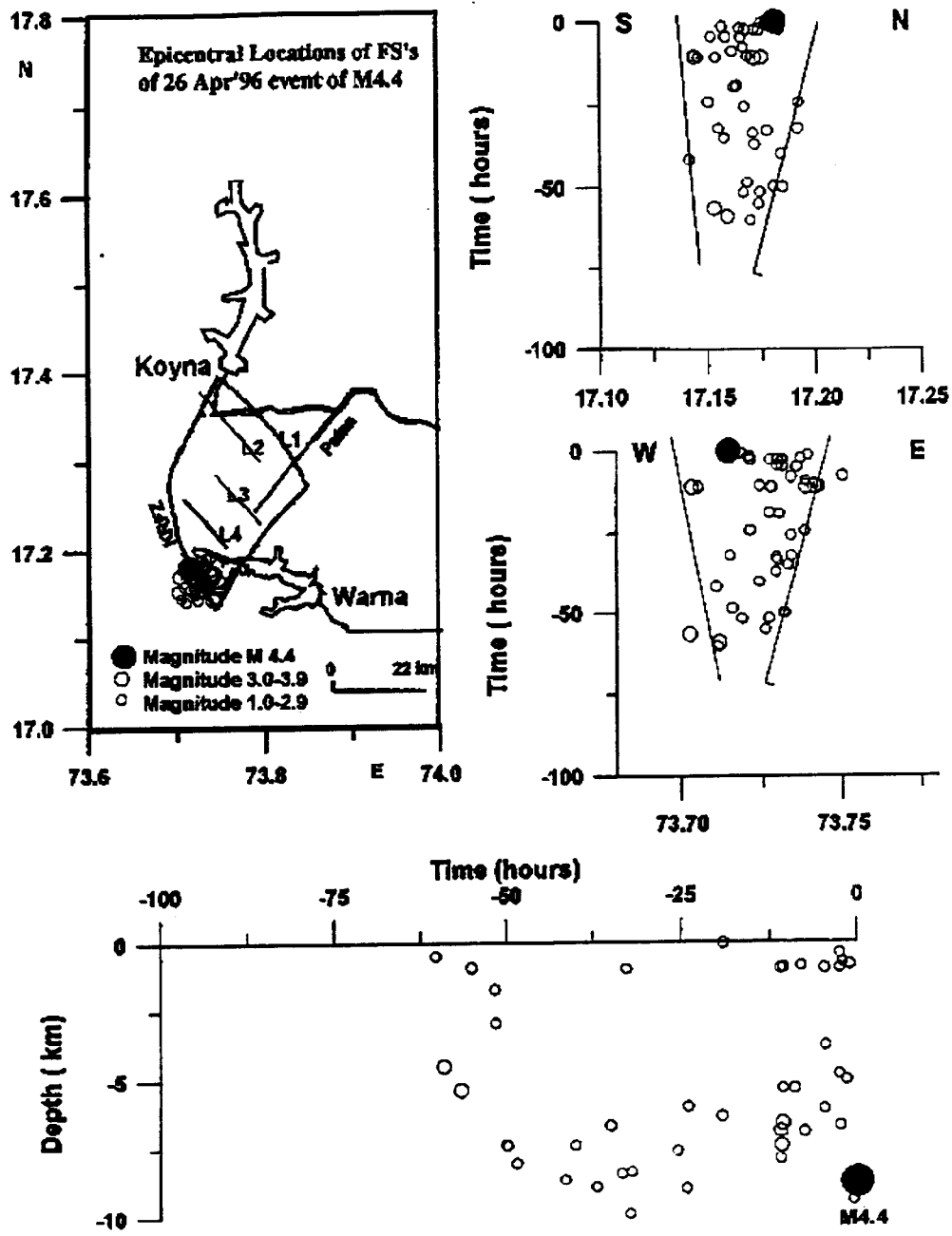
Figure 4. Nucleation process study for 26 April 1996 event (a) Epicentral location map for the foreshocks and (b) depth Vs time plot for the foreshocks.

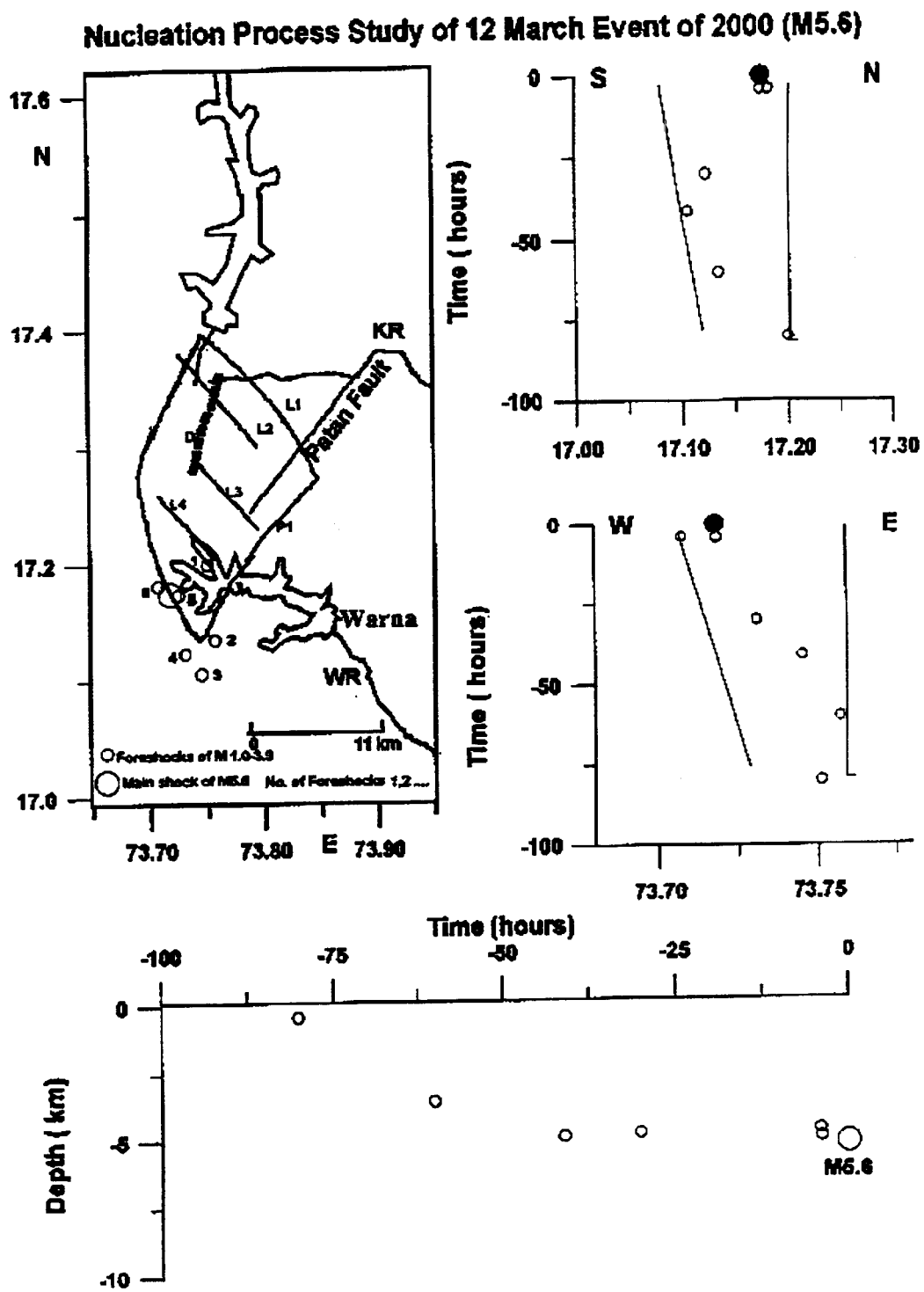
Figure 5. Nucleation process study for 12 March 2000 event (a)Epicentral location map for the foreshocks and (b) depth Vs time plot for the foreshocks.

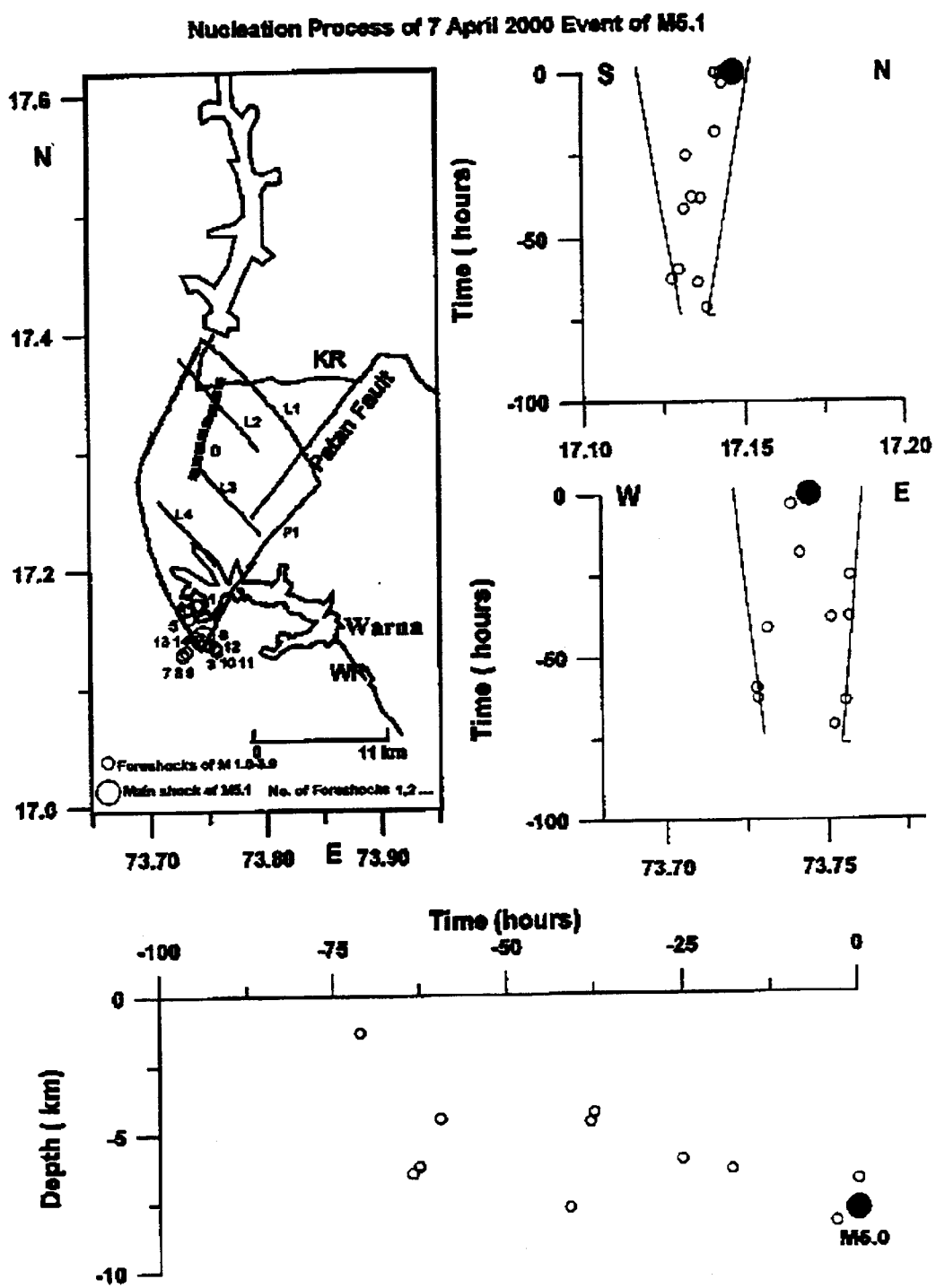
Figure 6: Nucleation process study for 6 April 2000 event (a) Epicentral location map for the foreshocks and (b) depth Vs time plot for the foreshocks.

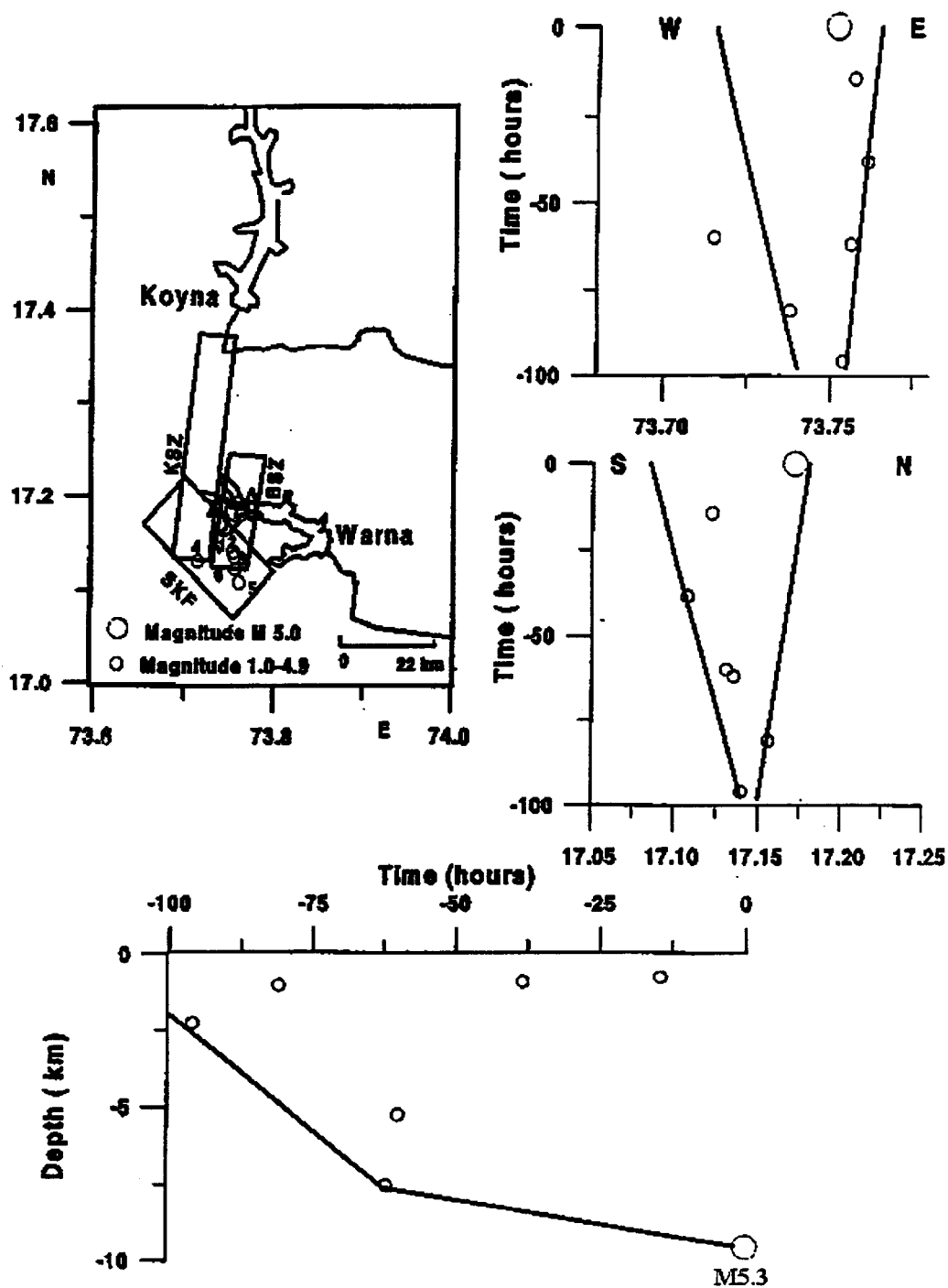
Figure 7. Nucleation process study for 5 September 2000 event (a) Epicentral location map for the foreshocks and (b) depth Vs time plot for the foreshocks.

FIGURE 8

| Obtain seismograms of shallow local earthquakes of focal depths less than or equal to the depth of base of the seismogenic layer. |

⇓

| Obtain refracted crustal phases Pg and Sg from the bottom of a granite layer and apply an earthquake location program on the refracted crustal phases to estimate hypocentral parameters selected from latitude, original time, focal depth and magnitude. |

⇓

| Select foreshock seismograms for the events that occur within 5-8 km of the mainshock location and about 100 hours prior to the occurrence of main shock. |

⇓

| Plot epicenters of foreshocks from the data obtained in the two immediately preceding steps to detect the spatial clustering. |

⇓

| Plot focal depths of foreshocks within the time-frame up to 100 hours prior to the main shock occurrence to observe a foreshock cluster defined as the nucleation zone of pre-seismic slip at shallow depth varying from 0 to 3 km depth. |

⇓

| Study the deepening of the nucleation zone over time and pinpoint the hypocenter and time of the main shock at the base of the seismogenic layer as a prediction for the plotted focal depth data. |

METHOD OF SHORT TERM FORECASTING OF MODERATE SIZE EARTHQUAKES

FILED OF INVENTION

The present invention relates to a digitally implemented method of short term forecasting of moderate size reservoir-triggered earthquakes. More particularly the present invention relates to short-term earthquake forecasting method for exactly foreseeing the hypocenter and the date of the occurrence of a moderate size reservoir-triggered earthquake.

BACKGROUND AND PRIOR ART REFERENCES

The reservoir-triggered earthquakes can lead to significant damages because of their location in the vicinity of thickly populated towns (Gupta and Rastogi, 1976). Presently, there are about 70 cases of reservoir-triggered seismicity in the Globe (Gupta, 1992). Damaging earthquakes exceeding magnitude 6 occurred near large reservoirs at Hsinfengkiang in China, at Kariba in the Zambia-Zimbabwe border region, at Kremasta in Greece, and at Koyna in India. So far, the largest and most damaging reservoir triggered earthquake occurred on Dec. 10, 1967 at Koyna region which claimed over 200 human lives, 1500 injured and rendered thousands homeless (Gupta et al., 1972, 1976, 1983, 1999 & 2002). Till date, one M6.3, seventeen earthquakes of $M \geq 5$ (where M is the intensity), about 170 earthquakes of $W \geq 4$ and hundred thousand of smaller events. Earthquakes of $M \geq 5$ occurred in 1967, 1968(probably an aftershock of 1967 event), 1973, 1980, 1993–94 and 2000 when certain conditions of reservoirs filling parameters are met (i.e. water level in Koyna and/or Warna reservoir exceeding the previous maximum (Kaiser effect), rate of loading exceeding 12 m/week and the retention time of high water level (Talwani, 1997; Rastogi et al., 1997; Gupta et al., 2002). It is inferred based on the estimation of moment release by $M \geq 5$ (where M is the intensity of earthquake) earthquakes including one M6.3 that the activity will continue for 34 decades with $M \geq 5$ earthquakes (Gupta et al., 2002). Thus, short-term prediction of $M \geq 5$ earthquakes will be quite important to mitigate seismic hazard of the region. It will also be important method for earthquake prediction for several other reservoir-triggered sites of the world. Earthquake prediction is debatable (Mogi, 1969). Nevertheless, there are at least three types of (conventional) earthquake prediction. Deterministic prediction is where the behavior before the earthquake (the stress interactions with the surrounding rocks, say) can be calculated (by whatever techniques are available) so that the time, place, and magnitude of the future large earthquakes can be estimated within well-defined windows (Di Luccio et al., 1997). Earth is complex, non-linear and heterogeneous at all scales which makes deterministic prediction difficult. Statistical prediction is where seismicity in the past can yield estimates of seismicity in the future. Statistical analysis of seismicity in the past in order to attempt to predict future behavior again fails because of complexity and heterogeneity. The third and most common type is where some key precursory phenomenon or a group of phenomena indicate that a large earthquake is imminent (Agnew and Jones, 1991). I suggest that all three types cannot predict time, place, and magnitude of a future large earthquake. It is complexity and heterogeneity that prevents it each time.

Foreshocks are just the small fraction of mainshocks that trigger aftershocks at the high end of the Gutenberg-Richter magnitude distribution, and thus with magnitudes greater than themselves (Utsu, 1969; Ogata et al., 1995; Abercrombie and Mori, 1996). Immediate foreshocks are the only incontrovertible, causal earthquake precursor but their cause and their relationship to their mainshock is not obvious (Dodge and Beroza, 1995; Many studies have demonstrated the strongly non-random clustering of foreshocks with mainshocks (e.g., Papazachos, 1975; Bowman and Kisslinger, 1984; Ohnaka, 1992; Console et al., 1993; Savage and dePolo, 1993; Ogata et al., 1995), but without a consistent idea emerging of the physical relationship between foreshocks and mainshocks. Foreshocks have been considered as accelerating failure (e.g., Jones and Molnar, 1979), as triggers of the mainshock (e.g., Dodge et al., 1995) and as mechanisms to delay the mainshock (e.g., Jones et al., 1982; Jones, 1984; Dodge et al., 1997). Earthquakes come in a range of magnitude 1 to 9, and they exhibit clustering in both space and time. Power law distributions of number versus energy and energy versus time before and after large events suggest that a complex systems approach to earthquake mechanics may yield new insights into the spatio-temporal distribution of slip for individual earthquakes, and into the spatio-temporal patterns of regional seismicity.

Foreshocks have been used to detect the nucleation process of large- or moderate size earthquakes, which in turn, leads to earthquake prediction. Quasi-static slip within the nucleation zone preceding the large/moderate size earthquakes has been noticed. For 1978 Izu peninsula earthquake of M7.2, the nucleation zone grew at a rate of 1 to 40 cm/sec before reaching a diameter of 10 km within one day of the mainshock (Ohnaka, 1992). According to this theory, foreshocks will cluster before the occurrence of mainshocks, therefore, accurate estimation of hypocentral parameters of foreshocks will make possible to detect foreshock clustering. The nucleation zone deepens with depth if mainshocks are occurring within the seismogenic layer otherwise nucleation zone propagates upwards. Accordingly, this theory obviously means that all of the earthquakes should nucleate at a point where the stress level exceeds critical level and then the rupture propagates along the fault zone causing foreshocks at asperities (Rastogi and Mandal, 1999; Singh et al., 1998; Mandal et al., 2000). And finally the nucleation zone reaches the base of the seismogenic layer to cause the main shocks.

The above-mentioned theory involves an assumption that the foreshocks should occur in a cluster and mainshock should occur within the seismogenic layer, seems to be rather unsuitable to predict earthquake, which occurred below the seismogenic layer, which may nevertheless cause a considerable damage. Thus, this method seems to be suitable for reservoir-triggered earthquakes, which generally would occur in a cluster due to the influence of fluids at hypocentral depth, characterized by shallow focal depths.

REFERENCES

Abercrombie, R, and J. Mori, 1996, Characteristics of foreshock occurrence to large earthquakes in the western USA, Nature, 381, 303–307.

Agnew, D. C., and L. M. Jones, 1991, Prediction probabilities from foreshocks, J. Geophys. Res., 96, 11,959–11, 971.

Bowman, J., and C. Kisslinger, 1984, A test of foreshock occurrence in the central Aleutian arc: Bull. Seismol. Soc. Amer., 74, 181–198.

Console, R., M. Murru, and B. Alessandrini, 1993, Foreshock statistics and their possible relationship to earthquake prediction in the Italian region: Bull. Seismol. Soc. Amer., 83, 1248–1263.

Di Luccio, F., R. Console, M. Imoto, and M. Murru, 1997, Analysis of short time-space range seismicity patterns in Italy: further step towards earthquake prediction, Annali di Geofisica, XL, 783–798.

Dodge, D. A. and G. C., Beroza, 1995, Foreshock sequence of the 1992 Landers, Calif., earthquake and its implication for earthquake nucleation, J. Geophys., Res. 100, 9865–9880.

Dodge, D. A., G. C. Beroza, and W. L. Ellsworth, 1995, The foreshock sequence of the 1992 Landers, Calif., earthquake and its implication for earthquake nucleation, J. Geophys. Res., 100, 9865–9873.

Dodge, D. A., G. C. Beroza, and W. L. Ellsworth, 1997, ???, J. Geophys. Res., 100, 9865–9873.

Gupta, H. K. and Rastogi, B. K., Dams and Earthquakes, Elesvier Scientific Publishing Company, Amsterdam, p. 288, 1976.

Gupta, H. K., Reservoir Induced Earthquakes, Elsevier Scientific Publishing Co., Amsterdam, p. 355, 1992.

Gupta, H. K., Rastogi, B. K., and Narain, H. Common features of the Reservoir associated seismic activities. Bull. Seism. Soc. America, 62, 481–492, 1972.

Gupta, H. K. and Combs, J. Continued seismic activity at the Koyna Reservoir site, India. Engineering Geology, 10, 307–313, 1976.

Gupta, H. K. Induced seismicity hazard mitigation through water level manipulation at Koyna, India: A suggestion. Bull. Seism. Soc. America, 73, 679–682, 1983.

Gupta, H. K. et al., Anatomy of surface rupture zones of two stable continental region earthquakes, 1967 Koyna and 1993 Latur, India. Geophy. Res. Letters, 26 (13), 1985–1988, 1999.

Gupta, H. K., Mandal, P. and Rastogi, B. K., 2002, How long triggered earthquakes at Koyna, India will continue?, Curr. Sci., 82 (2), 202–210.

Ohnaka, M., 1992, Earthquake source nucleation: A physical model for short-term precursors, Tectonophysics 211, 249–178.

Rastogi, B. K. and P. Mandal, 1999, Foreshocks and Nucleation of small and moderate size Koyna earthquakes (INDIA), Bull. Seism. Soc. Am. 89(3), 1–8.

Jones, L. M., 1984. Foreshocks (1966–1980) in the San Andreas System, California, Bull. Seismol. Soc. Amer., 74, 1361–1380.

Jones, L. M., and P. Molnar, 1979. Some characteristics of foreshocks and their possible relationship to earthquake prediction and premonitory slip on faults, J. Geophys. Res., 84, 3596–3608.

Jones, L. M., B. Q. Wang, S. X. Xu, and T. J. Fitch, 1982. The foreshock sequence of the Feb. 4, 1975, Haicheng earthquake (M=7.3), J. Geophys. Res., 87, 4575–4584.

Mandal, Prantik, B. K. Rastogi and C. S. P. Srama, 1998, Source Parameters of Koyna Earthquakes, India, Bull. Seis. Soc. Am., 88(3), 833–842.

Mandal, Prantik, B. K. Rastogi and Harsh Gupta, Recent Indian Earthquakes, Curr. Sci., 79, 101–113, 2000.

Mogi, K., 1969. Relationship between the occurrence of great earthquakes and tectonic structure, Bull. Earthq. Res. Inst., 47, 429–451.

Ogata, Y., T. Utsu, and K. Katsura, 1995, Statistical features of foreshocks in comparison with other earthquake clusters: Geophys. J. Int., 121, 233–254.

Ohnaka, M., 1992. Earthquake source nucleation: a physical model for short term precursors, Tectonophysics, 211, 149–178.

Papazachos, B., 1975, Foreshocks and earthquake prediction: Tectonophysics, 28, 213–226.

Rastogi, B. K., Chadha, R. K., Sarma, C. S. P., Mandal, P., Satyanaryana, H. V. S., Raju, I. P., Kumar, N., Satyamurthy, C. and Nageshwar Rao, A., Seismicity at Warna Reservoir (near Koyna) through 1995. Bull. Seism. Soc. Am., v. 87(6), 1484–1494, 1997.

Rastogi, B. K. and Mandal, P., Foreshocks and Nucleation of small and moderate size Koyna earthquakes (INDIA), Bull. Seism. Soc. Am., V. 89(3), 1–8, 1999.

Savage, M., and D. M. dePolo, 1993, Foreshock probabilities in the western great-basin eastern Sierra Nevada: Bull. Seismol. Soc. Amer., 83, 1910–1938.

Singh, S. K., M. Ordaz, T. Mikumo, J. Pacheco, C. Valdes and P. Mandal, Implications of a composite model and seismic-wave attenuation for the observed simplicity of small earthquakes and reported duration of earthquake initiation phase, Bull. Seism. Soc. Am., v. 88, 1171–1181, 1998.

Utsu, T., 1969. Aftershocks and earthquake statistics (I)— Investigation of aftershocks and other earthquake sequences based on a new classification of earthquake sequences, J. of Faculty of Science, Hokkaido Univ., Series VII (Geophysics), 3, Talwani, P. Seismotectonics of the Koyna-Warna Area, India. Pure Appl. Geophys., 150, 511–550, 1997.

OBJECTS OF THE INVENTION

The primary object of the present invention is to provide an earthquake forecasting method capable of foreseeing occurrence of a future earthquake and the epicenter in a simple manner.

Another object of the present invention is to obtain accurate and reliable hypocentral parameters (ERH<0.5 km and ERZ<1 km and RMS<0.1 s) in real time, which needs expensive telemetered network of digital stations.

Yet another object of the present invention is to detect foreshock clustering in real time. Further object of the present invention is to detect the nucleation zone for studying deepening of nucleation zone with time in real time.

Yet another object of the present invention is to make a successful short-term prediction of moderate size Koyna-Warna events.

SUMMARY OF THE INVENTION

The present invention provides a new earthquake forecasting method which comprises combined steps of observing/detecting a foreshock clustering/nucleation zone at shallow depth over a 100 hours period prior to the mainshock occurrence and observing/studying the deepening of nucleation zone with time to forecast, with a considerable accuracy, a future moderate size reservoir-triggered earthquake and the epicenter which may occur within two days after the foreshock clustering is observed.

BRIEF DESCRIPTION OF THE DRAWINGS

The attached seven figures (FIG. 1–7) are plots showing foreshock clustering and nucleation process prior to the moderate size Koyna-Waran earthquakes. FIG. 8 is a flow-chart.

FIG. 1 A plot showing three component of seismograms (vertical, north-south and east-west) recorded on 16 bit digital seismographs FIG. 2 Dec. 8, 1993 of M 5,0, FIG. 3 March 12, 1995 of M 4.7, FIG. 4 April 26, 1996 of M 4.4, FIG. 5 March 5, 2000 of M 5.2, FIG. 6 Sep. 2000 of M 5.3, FIG. 7 Sep. 2000 of M 5.3, and FIG. 8 is a flow chart of the method of the invention.

The present invention is further explained in the form of following examples. However these examples should not however be considered as limiting the scope of the invention.

The observation has been made over six years at that place of earthquake and the accurate records of the relationship between foreshock clustering in space and time have been collected. As a result, FIGS. 1 to 6 indicate typical 6 examples out of 8 examples obtained from the observation data during October 1993 through December 2000.

FIG. 1 shows three component seismograms recorded on a short period digital seismograph. In FIG. 1, the plot shows three components of seismograms (vertical, north-south and east-west), which are recorded on 16 bit digital seismographs. Pg and Sg phases are marked with a view to demonstrate the routine analysis of three component seismograms for a local earthquake. Generally, Pg is read from vertical and Sg is read from horizontal seismograms, either NS or EW, depending on clear phases. Similar analysis is carried out for another five or more stations. Then, these phase data, comprising Pg and Sg phases from at least six stations, along with a crustal velocity model, are used as inputs to a location program for estimating the hypocentral parameters for a local earthquake.

Example 1

FIG. 2 shows the nucleation process for the Dec. 8, 1993 event of M5.0. As shown in FIG. 2, the nucleation process study for the Dec. 8, 1993 event includes (a) an Epicentral location map for the foreshocks, and (b) a depth versus time plot for the foreshocks.

In example 1, spatial and temporal clustering of foreshocks as shown in FIG. 2 are used. It shows a 5 km×3 km zone of 10 foreshocks of M 1 to 3.8 for the Dec. 8, 1993 (M5.0) event along the L1 in the 100 hours time period. The maximum depth of foreshocks deepens from 1 to 9 km in 85 to 100 hours.

Example 2

FIG. 3 shows a nucleation process study for the Mar. 12, 1995 event of M4.7. As shown in FIG. 3, the nucleation process study for the Mar. 12, 1995 event includes (a) an Epicentral location map for the foreshocks, and (b) a depth versus time plot for the foreshocks.

In another example, FIG. 3 shows a total of 6 foreshocks of M 1.0 to 2.7 for 12 March (M4.7) event clustered along a 7 km×3 km area trending NNE-SSW along the north Koyna fault. It is seen that the maximum depths of foreshocks deepened from 1 to 9 km in 100 hours time.

Example 3

FIG. 4 shows a nucleation process study of the Apr. 26, 1996 event of M4.4. As shown in FIG. 4, the nucleation process study for the Apr. 26, 1996 event includes (a) an Epicentral location map for the foreshocks, and (b) a depth versus time plot for the foreshocks.

In another example, FIG. 4 demonstrates the nucleation process for the Apr. 26, 1996 event of M4.4. Foreshocks clustered in a zone of 8 km length along the south Koyna fault. The mainshock was preceded by 47 foreshocks of magnitude M1.0 to 3.7 in 100 hr.

Example 4

FIG. 5 shows a nucleation process study of the Mar. 12, 2000 event of M5.6. As shown in FIG. 5, the nucleation process study for the Mar. 12, 2000 event includes (a) an Epicentral location map for the foreshocks, and (b) a depth versus time plot for the foreshocks.

In another example, FIG. 5 demonstrates the nucleation process for the Mar. 12, 2000 event of M5.1. The most concentrated zone of foreshocks extends for 8 km in NW-SE direction along KRFZ. The hypocentral depths of foreshocks deepen from 1 to 5.2 km in 100 hours. For the main shock of Mar. 12, 2000, the earthquake rupture nucleated near a junction of Koyna River Fault Zone and a satellite fault P1 at a depth of 1 km and then propagated northwesterly to cause the main shock on the KRFZ at 5.2 km depth.

Example 5

FIG. 6 shows the nucleation process for the Apr. 6, 2000 event of M5.1. As shown in FIG. 6, the nucleation process study for the Apr. 6, 2000 event includes (a) an Epicentral location map for the foreshocks, and (b) a depth versus time plot for the foreshocks.

In another example, FIG. 6 demonstrates the nucleation process for the Apr. 6, 2000 event of M5.2. 15 Foreshocks of M1.0 to 3.8 clustered in a zone of 8 km length along the south Koyna fault. The rupture occurred very near to western boundary of Warna reservoir at 3 km depth (a 5 m change in water level in the Warna reservoir has been noticed during 1999) and then it propagated south—easterly along the KRFZ to cause the main shock near the junction of Koyna River Fault Zone and a satellite fault P1 at 7.8 km depth. The focal depths of foreshocks deepen from 3 km to 7.8 km in 100 hours.

Example 6

FIG. 7 shows a nucleation process study for the Sep. 5, 2000 event, which includes (a) an Epicentral location map for the foreshocks, and (b) a depth versus time plot for the foreshocks.

In another example, FIG. 7 demonstrates the nucleation process for the Sep. 5, 2000 event of M5.3. Most interestingly, the water level at Warna reached a new maximum on 1 September (maximum filling rate was 16.02 m/week) and the M 5.3 event occurred very near to Warna reservoir on Sep. 5, 2000. For this case, the first and second foreshocks occurred very near to reservoir boundary and other 4 foreshocks occurred south of it in a zone of 5 km length along the south Koyna fault. The maximum depths of foreshocks deepened from 1 km to 9 km in 100 hr. It will be important to note that the mainshock occurred at 9.39 km depth beneath the middle of Warna reservoir along a NE trending normal fault (USGS) suggesting a perfect case of reservoir triggered earthquake. The above-described figures depict that there is a slow growth in number of foreshocks during the period of 100 to 60 hours prior to the main shock corresponding to the quasi-static stage. Then there is quiescence around 60 to 40 hours prior to the occurrence of the mainshock. It is followed by a rapid increase starting 40 hours prior to the main shock corresponding to a quasi-dynamic stage as also observed by Ohnaka (1992). The growth rates of foreshock nucleation zone for Koyna region are estimated to be varying from 0.5 to 11 cm/s. Finally, the nucleation zone for both the cases attains a diameter of about 5–8 km before the occurrence of main shocks.

In practice of the present invention, the inventors have been making, since October 1993, a continuous observation of foreshock clustering and nucleation process of moderate size Koyna-Warna events (M≧4.3) (wherein M is the intensity). Till date, the nucleation process for nine moderate size Koyna-Warna earthquakes have been studied. The foreshocks of these earthquakes define a detectable zone of preseismic slip (5×5 km$_2$). Space-time clustering patterns of the foreshocks, which started 100 hours prior to the main shock, and within a distance of 5–8 km from the main shock epicenters were studied for deciphering the rupture nucleation. The nucleation process is depicted in three phases viz. quasi-static, quasi-dynamic and dynamic rupturing. The growth rate for foreshock nucleation zone is observed to vary from 0.5 to 11 cm/sec and finally attains a diameter of about 5–10 km before the occurrence of the main shock. It is found that the rupture nucleates at shallow depths (<1 km) and then gradually deepens to cause the main shock near the base of the seismogenic layer i.e. about 5–10 km in depth. Thus, this nucleation process preceding the mainshocks can be considered as an immediate earthquake precursor Koyna-Warna region.

As mentioned above, the present invention provides a method capable of actually and exactly forecasting the occurrence of an earthquake which comprises the steps of observing foreshock clustering developed over a period of 100 hours prior to the occurrences of mainshocks, and, the studying of deepening of nucleation zone to cause main shocks at the base of seismogenic layer (5–10 km). This enables making a short-term prediction with a lead-time of two days provided on-line real time accurate reliable hypocentral parameters are available.

Advantages

1. The method is quite significant for short-term forecasting of moderate size reservoir triggered earthquakes, which may be, applicable for any reservoir triggered seismicity sites. Presently, about 70 cases of reservoir triggered seismicity sites have been reported all over the World.

2. The method is very useful in mitigating seismic hazard in and around reservoir triggered seismicity sites. Damaging earthquakes exceeding magnitude 6 occurred near large reservoirs at Hsinfengkiang in China, at Kariba in the Zambia-Zimbabwe border region, at Kremasta in Greece, and at Koyna in India. So far, the largest and most damaging reservoir triggered earthquake occurred on Dec. 10, 1967 at Koyna region which claimed over 200 human lives, 1500 injured and rendered thousands homeless.

3. The method is quite simple, fast and easy to apply. It requires only online much precise hypocentral parameter estimates resulting in detection of clustering 100 hours prior to the mainshock. With the invention of state of art telemetered digital recorders equipped with GPS timing system it is now possible to have very accurate online estimation of hypocentral parameters for almost all reservoir triggered seismicity sites. Where generally seismicity will be tightly clustered and confined to only upper 10 km of the crust. Thus, this method can be tested easily for other reservoir triggered seismicity sites in the World.

What is claimed is:

1. A digital computer implemented method for accurate forecasting of a hypocenter of future moderate size earthquakes, by detecting a foreshock clustering and the deepening of nucleation zone at a shallow focal depth of a seismogenic layer, prior to the main shock occurrence, said method comprising the steps of:

(a) obtaining seismograms of shallow local earthquakes of focal depths less than or equal to the depth of base of the seismogenic layer;

(b) obtaining refracted crustal phases Pg and Sg from the bottom of a granite layer and applying an earthquake location program on the refracted crustal phases to estimate hypocentral parameters selected from latitude, original time, focal depth and magnitude;

(c) selecting foreshock seismograms for the events that occur within 5–8 km of the mainshock location and about 100 hours prior to the occurrence of main shock;

(d) plotting epicenters of foreshocks from the data obtained in steps (b) & (c), to detect the spatial clustering;

(e) plotting of focal depths of foreshocks within the time-frame up to 100 hours prior to the main shock occurrence to observe a foreshock cluster defined as the nucleation zone of pre-seismic slip at shallow depth varying from 0 to 3 km depth; and (f) studying the deepening of the nucleation zone over time and pinpointing the hypocenter and time of the main shock at the base of the seismogenic layer as a prediction for the plotted data of step (e).

2. A method according to claim 1, wherein the seismogram data for the seismograms are collected from a minimum of six different stations where occurrences of microearthquakes are maximum.

3. A method according to claim 1, wherein the shallow focal depth varies from 0–3 km.

4. A method according to claim 1, wherein the location program is a computer code using generalized inversion technique to compute travel times for direct as well as refracted waves of the Pg and Sg phases obtained from different stations to estimate the hypocentral parameters of an earthquake.

5. A method according to claim 1, wherein said earthquake location program is selected from the computer programs HYPO71PC, Velest, Joint for hypocentral determination and non-linear inversion.

6. A method according to claim 1, wherein the crustal phases obtained are longitudinal Pg and shear Sg waves.

7. A method according to claim 1, wherein the velocity of Pg varies between 5–8 km/s.

8. A method according to claim 1, wherein the velocity of Sg varies between 3–5 km/s.

9. A method according to claim 1, wherein the angular distance north or south from the earth's equator is the latitude that is expressed in degrees.

10. A method according to claim 1, wherein the angular distance east or west from a meridian that runs between north and south poles and passes through Greenwich, England is the longitude that is expressed in degrees.

11. A method according to claim 1, wherein focal depth is the depth of focus where the earthquake originates.

12. A method according to claim 1, wherein origin time is the time at which earthquake begins.

13. A method according to claim 1, wherein the measure of energy released during the occurrence of an earthquake is the magnitude.

14. A method according to claim 1, wherein the earthquake location program is a computer code using a generalized inversion technique to compute travel times for direct as well as refracted waves of the Pg and Sg phases obtained from different stations to estimate hypocentral parameters of an earthquake.

15. A method according to claim 1, wherein said earthquake location program is selected from HYPO71PC, Velest, Joint using hypocentral determination and non-linear inversion.

16. A method according to claim 1, wherein the foreshocks used are events of magnitude less than that of mainshock that occur within a radius of 5–8 km from the epicentral location of mainshock and 100 hour prior to the main shock.

17. A method according to claim 1, wherein said method is used for forecasting moderate intensity size up to $\geq 4.0$ reservoir-triggered earthquakes occurring in stable continental regions.

18. A method according to claim 1, said method is measured by an on-line real time estimation of hypo-central parameters of foreshocks and their images.

19. A method according to claim 1, wherein the on-line estimation of the hypocenter is obtained by telemetered earthquake phase data.

20. A method according to claim 1, wherein the epicenter/hypocenter of a future reservoir triggered earthquake is determined by the detection of a foreshock clustering/nucleation zone at shallow depths that deepens with time.

21. A method according to claim 1, said forecast is carried out by accurately determined on-line hypocentral parameters of foreshocks.

22. A method according to claim 1, wherein the detection of foreshock clustering and nucleation zone at a shallow depth occurs over 100 hours period prior to the occurrence of the mainshock.

23. A method according to claim 1, wherein a future moderate size earthquake and the epicenter is measured accurately two days in advance of foreshock clustering.

24. A method according to claim 1, wherein said method is used to forecast short term earthquakes triggered by a reservoir in a cluster due to the influence of fluids at hypocentral depth.

* * * * *